United States Patent [19]
Shin et al.

[11] Patent Number: 5,734,841
[45] Date of Patent: Mar. 31, 1998

[54] CIRCUIT FOR PLUG/PLAY IN PERIPHERAL COMPONENT INTERCONNECT BUS

[75] Inventors: Dong Woo Shin; In Sun Yoo, both of Ichonshi, Rep. of Korea

[73] Assignee: Hyundai Electronics Industries Co., Ltd., Rep. of Korea

[21] Appl. No.: 668,362

[22] Filed: Jun. 26, 1996

[30] Foreign Application Priority Data

Jun. 30, 1995 [KR] Rep. of Korea ............... 1995-19159

[51] Int. Cl.⁶ ........................................ G06F 13/00
[52] U.S. Cl. ................................ 395/282; 395/283
[58] Field of Search ........................ 395/282, 283, 395/284, 306, 828, 830

[56] References Cited

U.S. PATENT DOCUMENTS

| | | | |
|---|---|---|---|
| 4,607,348 | 8/1986 | Sheth | 395/877 |
| 4,730,317 | 3/1988 | Desyllas et al. | 371/22.6 |
| 5,379,384 | 1/1995 | Solomon | 395/325 |

Primary Examiner—Jack B. Harvey
Assistant Examiner—Ario Etienne
Attorney, Agent, or Firm—Blakely Sokoloff Taylor & Zafman

[57] ABSTRACT

A circuit or plug/play (P/P) in a PCI bus which can store information in a PCI master/target device so that an address input board or component installed in a PCI local bus necessary for developing an information processing system adopting the PCI bus can support complete automatic, the circuit including controlling means for generating a plurality of latch enabling signals having a predetermined delay time, in accordance with a PCI reset signal, a clock signal and an address signal for reading data, input generating means having a plurality of input generating blocks and generating a plurality of data to be written in corresponding latches, in accordance with the PCI reset signal, data latching means having a plurality of latches, constituted by a plurality of latch groups corresponding to the plurality of input generating blocks, for writing data applied from the input generating means, in accordance with the latch enabling signals from the controlling means; and a PCI interface for reading and outputting corresponding data written in the respective latch groups in the latching means, in accordance with the address signal for reading externally supplied data.

9 Claims, 4 Drawing Sheets

CIRCUIT FOR PLUG/PLAY IN PERIPHERAL COMPONENT INTERCONNECT BUS

BACKGROUND OF THE INVENTION

The present invention relates to a circuit for storing data for plug/play (P/P), and more particularly to a circuit for P/P necessary for developing an information processing system which utilizes a peripheral component interconnect (PCI) bus. A processing system which uses a PCI bus incorporates, as part of a compatibility problems under software control.

SUMMARY OF THE INVENTION

Therefore, it is an object of the present invention to provide a circuit for plug/play (P/P) in a PCI bus which can store information in a PCI master/target device so that an address input board or component installed in a PCI local bus necessary for developing an information processing system adopting the PCI bus can support complete automatic batch.

To accomplish the above object, there is provided a circuit for P/P used for an information processing system adopting the PCI bus, comprising: controlling means for generating a plurality of latch enabling signals having a predetermined delay time, in accordance with a PCI reset signal, a clock signal and an address signal for reading data; input generating means having a plurality of input generating blocks and generating a plurality of data to be written in corresponding latches, in accordance with the PCI reset signal; data latching means having a plurality of latches, constituted by a plurality of latch groups corresponding to the plurality of input generating blocks, for writing data applied from the input generating means, in accordance with the latch enabling signals from the controlling means; and a PCI interface for reading and outputting corresponding data written in the respective latch groups in the latching means, in accordance with the address signal for reading externally supplied data.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
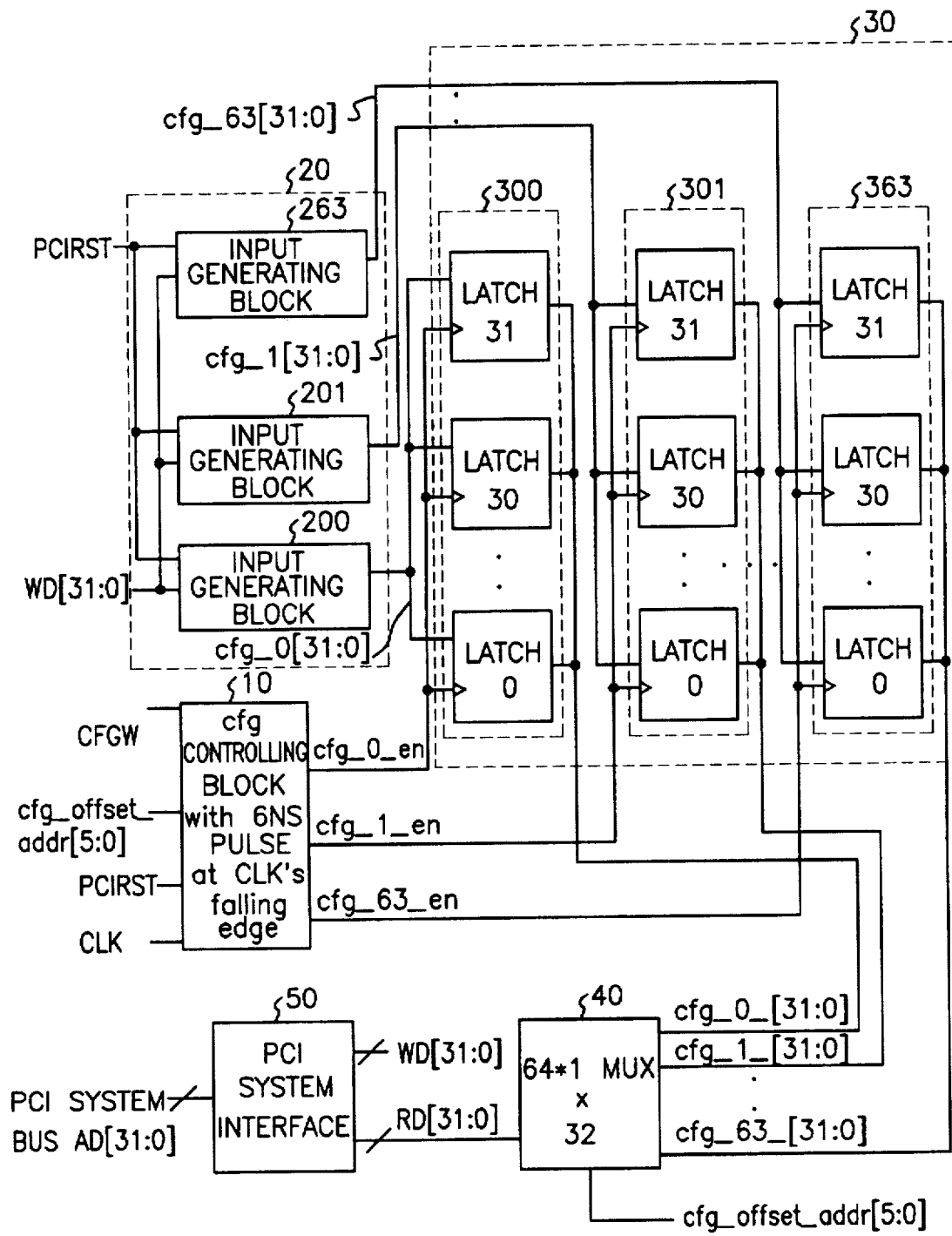
FIG. 1 is a block diagram of a circuit for P/P in a PCI bus according to a preferred embodiment of the present invention.

As shown in FIG. 1, the circuit for P/P according to the present invention includes a controlling block 10, an input generating block group 20, a latch unit group 30, a multiplexer (MUX) 40 and a PCI system interface 50.

Here, the input generating block group 20 includes a plurality of input generating blocks 200–263. Also, the latch unit group 30 includes a plurality of latch groups 300–363 and each latch group has latches 0 through 31.

In the circuit for P/P according to the present invention, since 64 times of addressing of double words (4 bytes) are allowed, the maximum batch address region per PCI device can support a 256-byte region in total. Therefore, each device can restrictively use only a necessary region. Here, the addressing method adopts CFCh and CF8h ports which are I/O address regions and a 6-bit offset address, thereby writing data in a desired register and reading the written data.

Figure 3A:
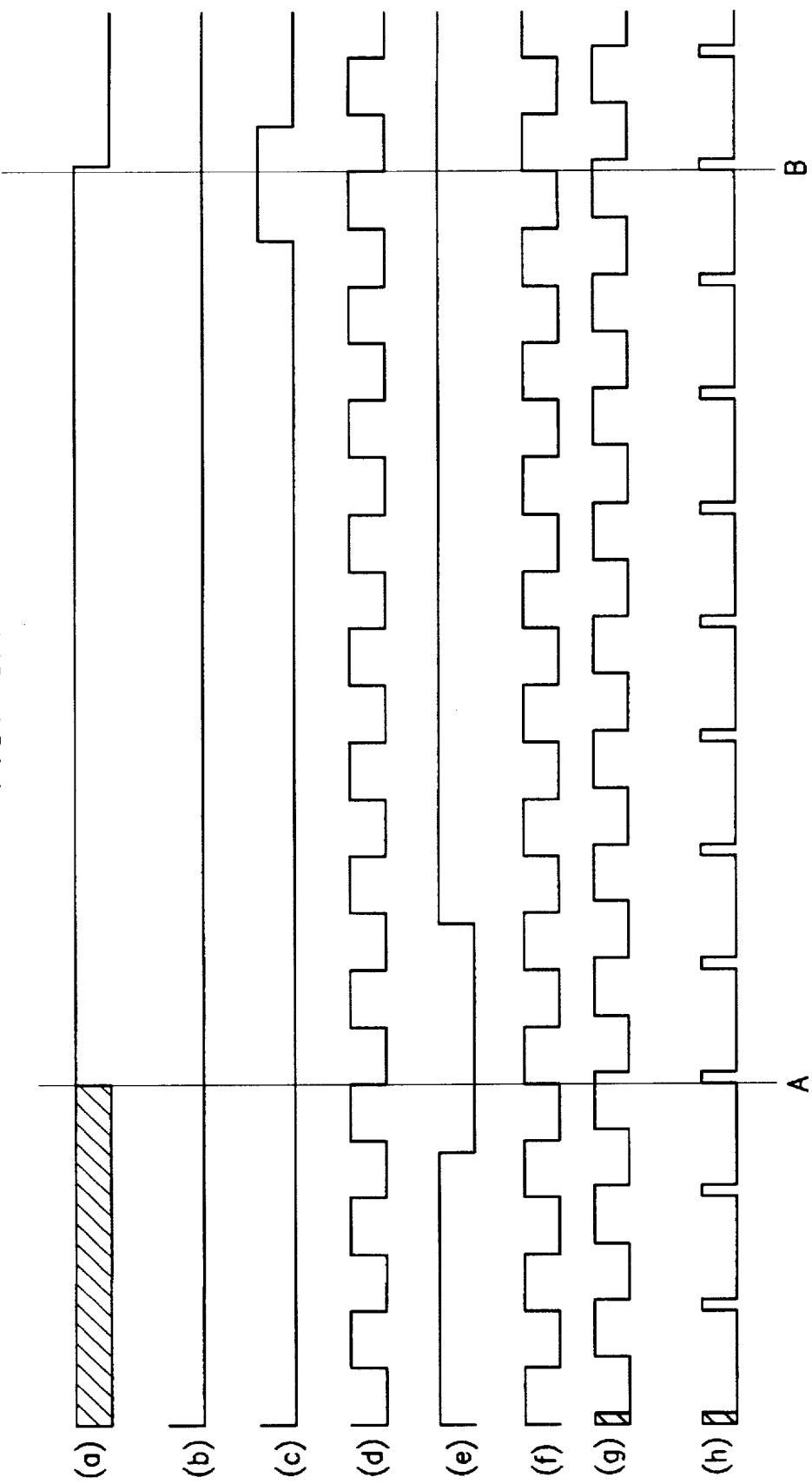
FIGS. 3A and 3B are waveform diagrams showing signal waveforms in various portions, according to the present invention.

In FIG. 1, the controlling block 10 receives a CFGW signal having a waveform as shown in FIG. 3A (c), a cfg_offse_addr [5:0] signal, a PCI reset signal PCIRST having a waveform as shown in FIG. 3A (e), and a clock signal CLK having a waveform as shown in FIG. 3A (d). Also, the controlling block 10 generates a latch enabling signal cfg_n_en for the corresponding latch group among the plurality of latch groups at the falling edge of the clock signal CLK in the form of a 6 ns pulse. In other words, the controlling block 10 generates outputs cfg_0_en, cfg_1_en, ... cfg_63_en of logic high levels for 6 ns at the first falling edge of the clock signal CLK after the PCIRST is applied.

As described above, the controlling block 10 uses the 6 ns pulse as the enabling signal of a system latch (the respective latch groups of the latch unit group 20) at the falling edge of the clock signal CLK, the reason for which will now be described.

That is to say, since the overall chips are synchronized at a rising edge of the clock signal CLK, the data is input to the respective latch during a clock rise and the 6 ns pulse enabling signal is generated at the falling edge of the clock signal CLK, a sufficient clock margin is supplied to the input, thereby enhancing the reliability of the overall system.

Therefore, only the corresponding latch group among the plurality of latch groups of the latch unit group 30 is enabled so as to receive the input of the corresponding input generating block of the input generating block group to then renew the same as a new value given by the system. The detailed configuration of the controlling block 10 will be described in detail later with reference to FIG. 2.

The input generating block group 20 is constituted by a plurality of input generating blocks 200–263, and applied the data generated from the respective input generating blocks 200–263 to the corresponding latch groups in the latch unit group 30 if a PCIRST signal is input. Therefore, the data supplied from the respective corresponding input generating block groups 200–263 of the input generating block group 20 are stored in the respective latch groups in the latch unit groups 30. At this time, the data applied to the respective latch groups are set to a default value set at the time of manufacturing the device.

The register can record data in the respective latches or read data stored in the latch by a system software as well as the PCIRST signal. When the data is read by the system software, commands such as a CFGW signal and cfg_offset_addr [5:0] are loaded on the PCI bus in the address phase of the PCI system.

Therefore, if the CFGW signal is applied to the PCI system interface 50, AD [31:0] becomes an input bus. As a result, valid data will be loaded on AD [31:0] in consecutive data phases. As described above, the respective input generating blocks 200–263 of the input generating block group 20 receives WD [31:0] as an input and generates the same as an output. Therefore, the data output from the respective input generating blocks 200–263 are written on the respective latches in the respective latch groups, that is, renewed as a new data value given by the system.

According to the present invention, in reading the batch data written in the respective latch groups in the latch unit group 30, the PCI system bus transmits the CFGR signal and cfg_offset_addr [5:0] signal to supply the same to the controlling block 10. Then, the multiplexer (64*1MUX×32) 40 loads the data of the corresponding latch among the respective latches of the latch groups on RD [31:0] according to the input cfg_offset_addr [5:0] signal. Therefore, the reading of the data written in the respective latch groups 300–363 is performed through such a process.

Figure 2:
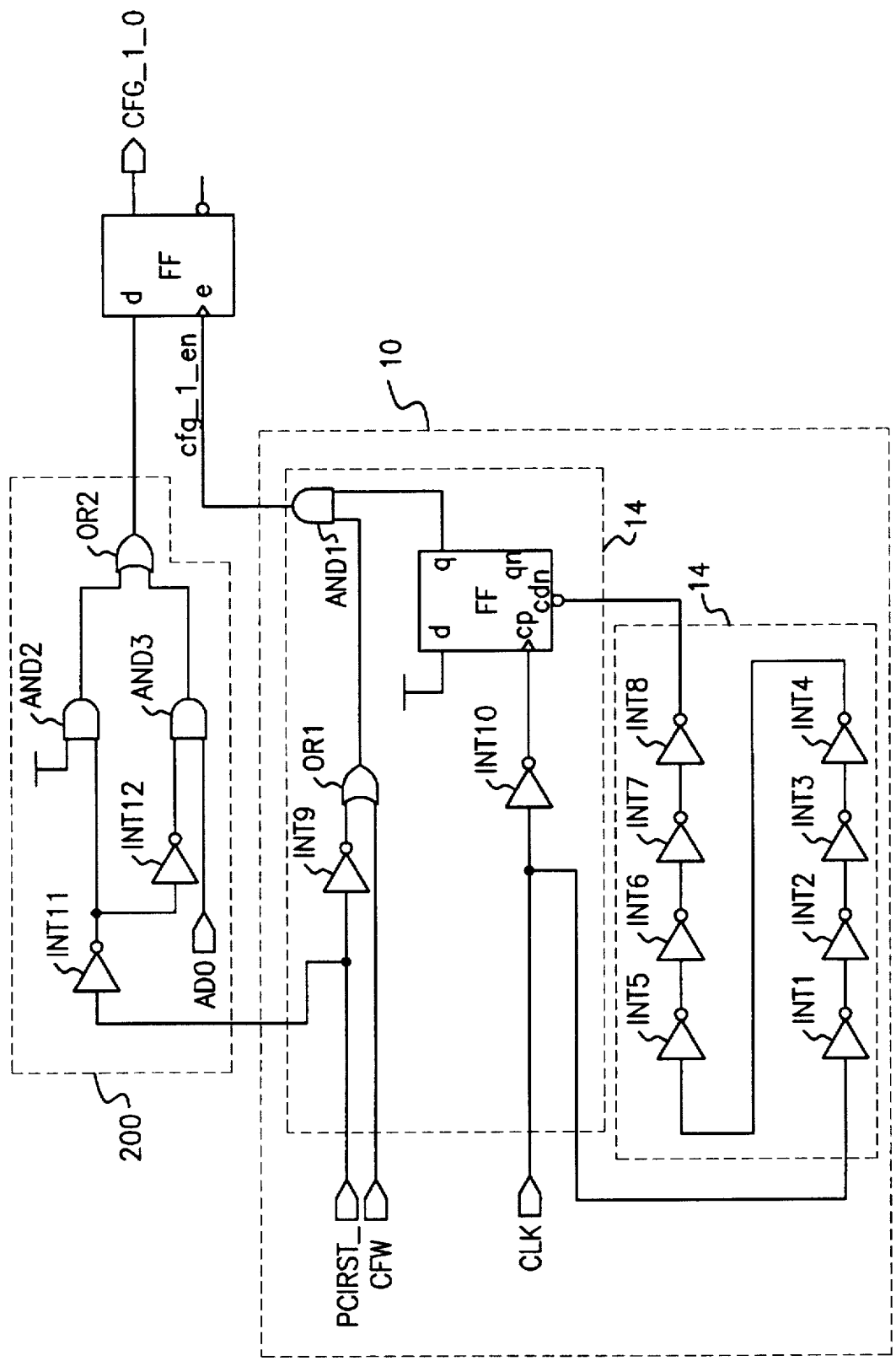
FIG. 2 is a circuit diagram illustrating an embodiment in which one latch from the latch group consisting of a plurality latches is shown, according to the present invention.

FIG. 2 is a circuit diagram illustrating an embodiment in which one latch from the latch group consisting of a plurality latches (latches 0 through 31) is shown, according to the present invention.

As shown in FIG. 2, the controlling block 10 which is a feature of the present invention, is constituted by a delay block 12 having a plurality of inverters and a logic circuit block 14 having a plurality of logic elements receiving various inputs and the output of the delay block 12.

In FIG. 2, the delay block 12 of the controlling block 10 including eight inverters INT1–INT8 serially connected with one another, receives a clock CLK having such a waveform as shown in FIG. 3A (d) and generates a 6 ns-delayed pulse signal shown in FIG. 3A (g) to supply the same to a flipflop FF of the next stage logic circuit block 14.

Next, the logic circuit block 14 of the controlling block 10 includes a first OR gate OR1 whose one end input is connected to the PCIRST signal via the ninth inverter INT9 and whose other end input is connected to the CFW signal, a flipflop FF whose one end input is connected to the clock CLK via the tenth inverter INT10 and whose other end input is connected to the output of the eighth inverter INT8 of the delay block 12, and a first AND gate AND1 whose one end input is connected to the output of the first OR gate OR1 and whose other end input is connected to the output of the flipflop FF.

Therefore, in the logic circuit block 14 having the aforementioned configuration, the flipflop FF generates a 6 ns-delayed pulse signal shown in FIG. 3A (h) in accordance with the pulse signal having the waveform shown in FIG. 3A (f) which is obtained by inverting the clock signal through the tenth inverter INT10 and the pulse signal having the waveform shown in FIG. 3A (g) and supplied from the delay block 12, to then supply the generated pulse signal to the other end input of the first AND gate AND1 of the next stage.

Therefore, the first AND gate AND1 generates a latch enabling signal cfg_1_en having a delay time of 6 ns at a falling edge of the clock CLK in accordance with the pulse signal supplied from the first OR gate OR1 and that supplied from the flipflop FF, to then supply the same to the corresponding latch making up the latch group. Therefore, the data is written in the respective latches of each latch group making up the latch unit group 30 in accordance with the latch enabling signal cfg_1_en from the controlling block 10.

As described above, when the latch enabling signal cfg_1_en is applied from the logic circuit block 14 of the controlling block 10 to the corresponding latch, the data applied from the respective input generating blocks (e.g., 200 of FIG. 1) of the input generating block group 20 is written in the corresponding latch.

In such a manner, when the respective latches making up the latch group are enabled in accordance with the latch enabling signal from the controlling block 10, the respective input generating block 200 for applying data to the corresponding latch includes a second AND gate AND2 whose one end input is connected to the PCIRST signal via the eleventh inverter INT11 and whose other end input is connected to a power-supply voltage VCC, a third AND gate AND3 whose one end input is connected to the the output of the eleventh inverter INT11 via the twelfth inverter INT12 and whose other end input is connected to an AD0 port, and a second OR gate OR2 receiving the output of the two AND gates AND2 and AND3, as shown in FIG. 2.

Therefore, the respective input generating blocks of the input generating block group 20 having the aforementioned configuration apply the generated data to the corresponding latch when the corresponding latch groups are enabled in accordance with the latch enabling signal cfg_n_en from the controlling block 10.

Figure 3B:
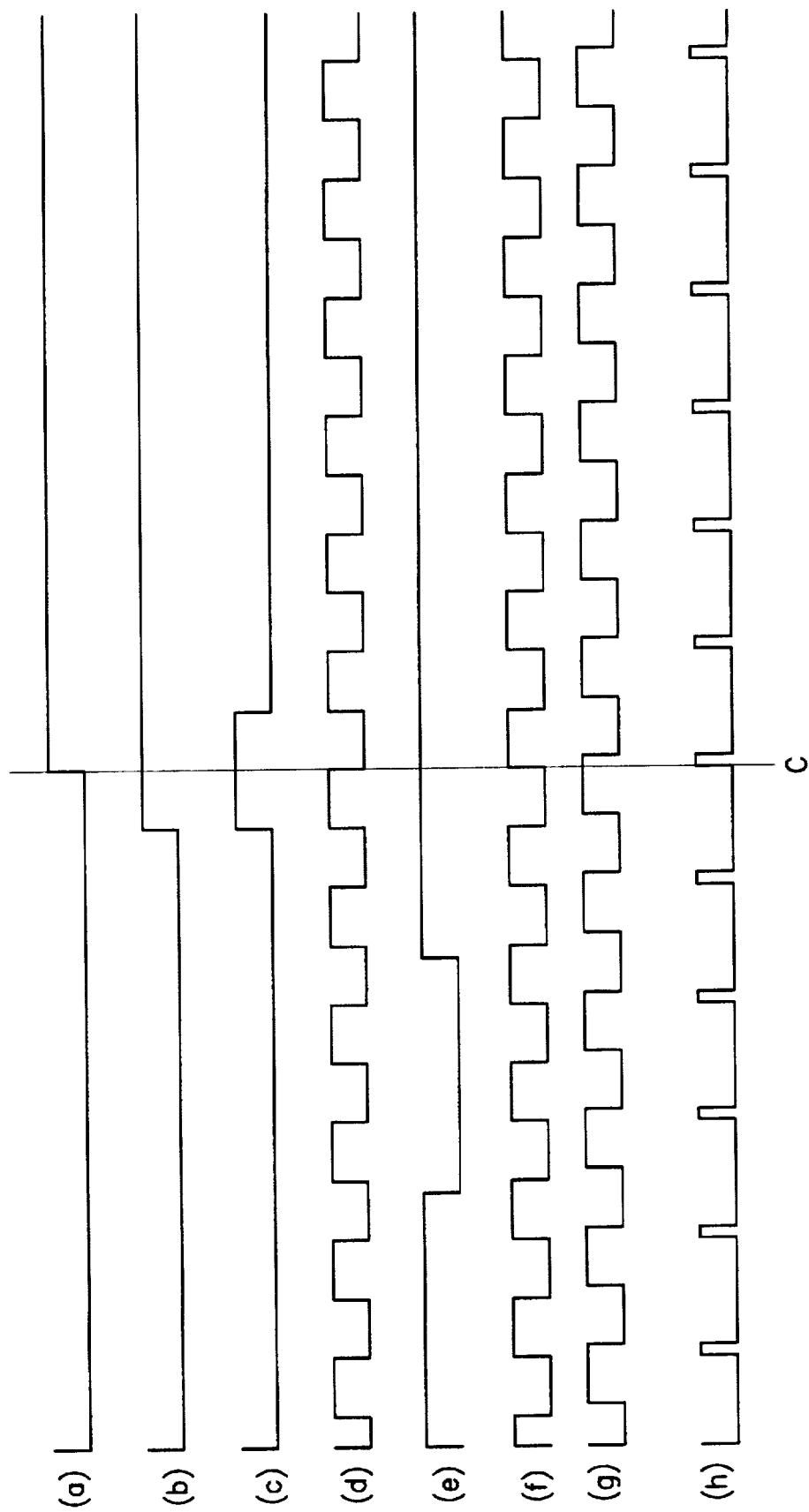

In FIGS. 3A and 3B, a portion A vertically marked in a solid line represents that a signal of a logic high level (default value) is stored in the corresponding latch during the period of the PCIRST signal, a portion B represents that a signal of a logic low level of the AD0 port is stored in the corresponding latch during the period of the CFGW signal (i.e., at the time of writing data), and a portion C represents that the data value (logic low level) stored in the current latch is output as cfg_1_0 during the period of the CFGR signal (i.e., at the time of reading data).

As described above, the circuit for P/P according to the present invention simplifies a system batch processing of a personal computer, i.e., power-off→card insertion→rebooting. Also, by using a 6 ns-delayed signal generated at the falling edge of a clock as an enabling signal of each latch, a sufficient clock margin is provided to an input, thereby enhancing the stability of the overall system.

What is claimed is:

1. A circuit for plug/play used for an information processing system adopting the PCI bus, comprising:

controlling means for generating a plurality of latch enabling signals having a predetermined delay time, in response to a PCI reset signal, a clock signal and an address signal for reading date;

input generating means having a plurality of input generating blocks and generating a plurality of data to be written in corresponding latches, in response to said PCI reset signal;

data latching means having a plurality of latches, constituted by a plurality of latch groups corresponding to said plurality of input generating blocks, for writing data applied from said input generating means, in response to said latch enabling signals from said controlling means; and a PCI interfacing means for reading and outputting corresponding data written in said respective latch groups in said latching means, in response to said address signal for reading externally supplied data.

2. A circuit for Plug/Play in a PCI bus as claimed in claim 1, wherein said latch enabling signals are 6 ns-delayed pulse signals of said clock signal.

3. A circuit for Plug/Play P/P in a PCI bus as claimed in claim 1, wherein said controlling means is constituted by pulse delaying means having a plurality of inverters for delaying said clock signal for 6 ns, and logic circuit means for generating said latch enabling signals having a delay time of 6 ns in accordance with said PCI reset signal, said clock signal and said clock signal delayed from said pulse delaying means.

4. A circuit for Plug/Play in a PCI bus as claimed in claim 3, wherein said pulse delaying means is constituted by delay gates serially connected with one another.

5. A circuit for Plug/Play in a PCI bus as claimed in claim 3, wherein said logic circuit means is constituted by a first OR gate whose one end input is connected to said PCI reset signal via a first inverter and whose other end input is connected to said address signal for data reading, a flipflop whose one end input is connected to said clock via a second inverter and whose other end input is connected to the output of said pulse delaying means, and a first AND gate whose one end input is connected to the output of said first OR gate and whose other end input is connected to the output of said flipflop.

6. A circuit for Plug/Play in a PCI bus as claimed in claim 1, wherein the data generated from said input generating means is a predetermined default value.

7. A circuit for plug/play in a PCI bus as claimed in claim 1, wherein each of said input generating blocks in constituted by a first AND gate whose one end input is connected to the PCI reset signal via a first inverter and whose other end input is connected to a power-supply voltage, a second AND gate whose one end input is connected to the output of said first inverter via a second inverter and whose other end input is connected to an AD0 port, and a second OR gate receiving the outputs of said two AND gates.

8. A circuit for plug/play in a PCI bus as claimed in claim 6, wherein each of said input generating blocks is constituted by a first AND gate whose one end input is connected to the PCI reset signal via a first inverter and whose other end input is connected to a power-supply voltage, a second AND gate whose one end input is connected to the output of said first inverter via a second inverter and whose other end input is connected to an AD0 port, and a second OR gate receiving the outputs of said two AND gates.

9. A circuit for Plug/Play in a PCI bus as claimed in claim 1, wherein said PCI interfacing means is constituted by a multiplexer for reading data of the corresponding latch group among said plurality of latch groups in accordance with an externally supplied address signal for data reading, and an interface for supplying the data read from said corresponding latch group and supplied from said multiplexer to said PCI bus.

* * * * *

UNITED STATES PATENT AND TRADEMARK OFFICE
CERTIFICATE OF CORRECTION

PATENT NO. : 5,734,841
DATED : March 31, 1998
INVENTOR(S) : Shin et al.

It is certified that error appears in the above-identified patent and that said Letters Patent is hereby corrected as shown below:

In column 1, at line 11, please delete " part of a " and insert -- part of a PCI specification, a register which aids with solving system --.

In column 2, at lines 17,19 and 30, please delete " 6 ns " and insert -- 6ns --.

In column 4, at line 55, please delete " 6 ns " and insert -- 6ns --.

Signed and Sealed this

Thirteenth Day of October 1998

BRUCE LEHMAN

*Attest:*

*Attesting Officer*              Commissioner of Patents and Trademarks